Nov. 11, 1930.  P. O. ROCKWELL  1,781,664
PROCESS AND APPARATUS FOR PURIFYING AIR
Filed July 2, 1926
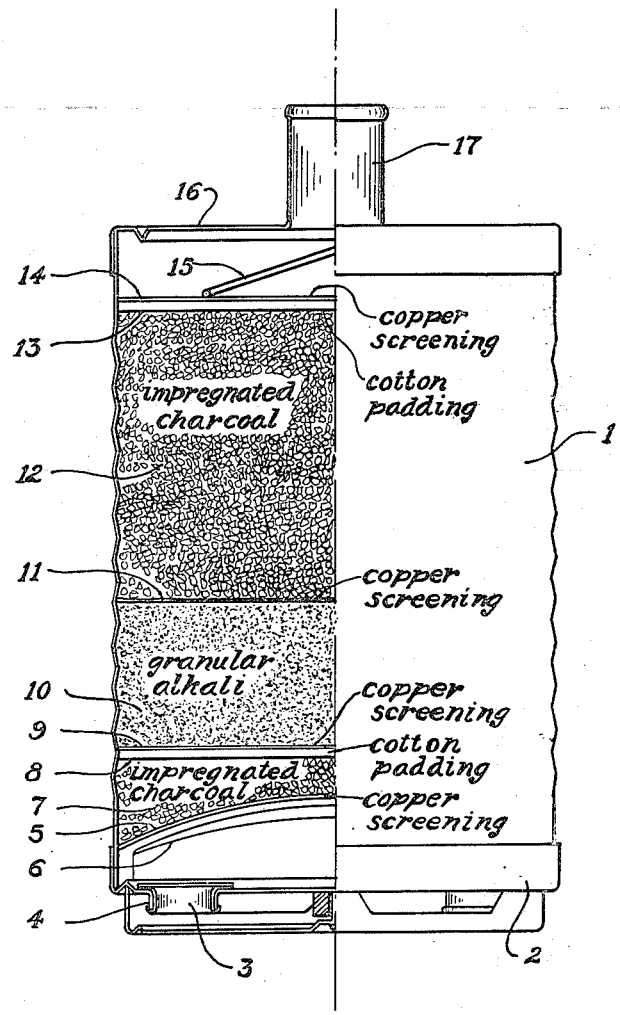
INVENTOR.
Paul O. Rockwell
BY Chas. Silver
ATTORNEY.

Patented Nov. 11, 1930

1,781,664

UNITED STATES PATENT OFFICE

PAUL O. ROCKWELL, OF EDGEWOOD ARSENAL, MARYLAND

PROCESS AND APPARATUS FOR PURIFYING AIR

Application filed July 2, 1926. Serial No. 120,073.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

This application is a continuation in part of my application, Ser. No. 16,964, filed March 20, 1925.

This invention relates to a method and apparatus for purifying air contaminated and vitiated with toxic or irritating gases, more particularly cyanogen chloride, with or without other toxic gases such as hydrocyanic acid.

Among the objects of this invention is the provision of a process and apparatus for protection of man or animal against the toxic influence of polluted air containing toxic gases such as cyanogen chloride and mixtures of cyanogen chloride and other toxic gases.

Another object of this invention is to provide a method and apparatus whereby air which has been polluted or contaminated with toxic gases of this character will be purified and rendered suitable for breathing by man or animal and without producing toxic effects.

A further object of this invention is to provide a method and apparatus for withdrawing constituents of an acid nature, for example cyanogen chloride and other gases admixed therewith, such as hydrocyanic acid, from air or other gas mixtures in an efficient and comparatively inexpensive manner resulting in complete removal of the constituent of acid nature or toxic gases from the air or gas mixture.

A still further object of this invention is to provide a process and apparatus for use by persons engaged in fumigating ships, buildings, vegetation or other places with cyanogen chloride and mixtures of cyanogen chloride and other toxic gases such as hydrocyanic acid.

In purifying gases it is the practice to pass the air thru a column of absorbents which have been sized to make the resistance to air flow satisfactory. When the gases are passed thru and over these absorbents the undesirable constituents are absorbed. In the case of air, it may then be breathed.

Many absorbents have been used for gas purification, among which are charcoal, soda lime, gels such as iron and silica, charcoal and pumice, or coke impregnated with alkalies.

When the undesirable constituents are acid gases, it has been the practice to employ these absorbents in a moist condition. By moist condition, it is not to be inferred that the absorbents are moist to the touch, but do contain a sufficient amount of water to be in equilibrium with air of normal humidity and temperature.

The presence of water is not, however, necessary for the absorption of many compounds; in fact, in some cases it may be detrimental. I have therefore chosen to use drying agents in combination with the absorbents to keep the latter in a fairly dry state. As drying agents I use any of the well known substances, such as calcium chloride, silica gel, sulphuric acid, caustic silicate, etc. My preferred absorbents are those substances which are absorbents of other vapors as well as water vapor.

The granular caustic silicate is a material in which caustic soda is combined with a material containing silica or alumina. It may be prepared by combining caustic soda with pumice at about 140° C., using a concentrated solution of the alkali, after which the caustic solution is drained off and the granules of caustic pumice so formed are dried at an elevated temperature to secure complete drying.

When other drying agents are used such as calcium chloride or silica gel, they are dried previous to their employment as fillers in order to secure maximum drying power.

With the drying agent I use a second absorbent which is a granular inorganic alkaline material. A number of substances are satisfactory, such as charcoal, pumice or coke impregnated with alkalies. The material may be an alkaline substance itself, such as iron gel, aluminum gel, etc. A preferred material is an activated charcoal which contains or is mixed with an active alkali. One such material is activated cocoanut charcoal of 8–14 mesh which is impregnated with NaOH. It is prepared by soaking the activated charcoal of this size for about an hour in sodium hydroxide solution and dried at 200° C. The amount of alkali impregnated on cocoanut charcoal which has an apparent density of 0.4 to 0.5 is preferably 1 to 10%. However the optimum amount of alkali which is added to the charcoal depends upon the structure of the charcoal, the amount of substance which may be added increasing with the porosity.

Another impregnated charcoal may be made by soaking charcoal in a 2% solution of ammonia water for several hours, after which it is drained and then dried in thin layers by passing dry air over same at about 30° C. for about two days. It has been found advantageous in some cases to add a small amount, for example 1%, of sodium hydroxide to the solution. The ammonia in the charcoal takes up carbon dioxide, which is usually present.

Many other substances may be added to the charcoal such as the alkali salts of weak acids, mixtures of alkali salts and hexamethylenetetramine, and the hydroxides of metals, particularly those of calcium, magnesium, iron, aluminum, zinc, etc. The optimum amounts to be added vary with the impregating substances and, with the porosity of the charcoal.

The absorbent may also be made by mixing finely ground activated carbon with the above mentioned alkalies in a moist state, drying and grinding to the desired size.

Iron and aluminum gels, being hard granular substances, may also be used. They are generally prepared from a soluble iron or aluminum salt by precipitating, drying and washing. The final washing may if desired be with water containing soluble alkalies, since the alkali left in the gel before final drying may be found beneficial.

In the accompanying drawing I have shown an apparatus employing granulated pumice impregnated with caustic alkali, which constitutes a specific embodiment of my invention, and comprises a canister shown partly in elevation and partly in section.

This canister comprises a water proof casing (1), preferably made of sheet metal, but it is to be understood that other waterproof materials such as impregnated paper or fiber can be used under varying conditions, and a close fitting bottom cover (2), said bottom having perforations for receiving check valves (3). These check valves are preferably made of rubber, and in order to insure a proper seating of these valves, there are provided the sleeves (4) upon the bottom (2). Inside of the casing (1) and above the valves (3) is a screen (5), preferably 20 mesh copper screening, held in position by a suitable support (6). Above this screen there is placed a quantity of activated carbon or charcoal (7) impregnated with a hydroxide of an alkali metal, such as NaOH or KOH and preferably in the form of coarse granules and above this impregnated charcoal (7) is a cotton pad (8) and screen (9) upon which is placed a layer of granular alkali material such as pumice granules which have been treated with a suitable alkali (10). Upon this pumice is a screen (11) on which is another layer of activated carbon (12) impregnated with a hydroxide of an alkali metal, such as NaOH or KOH and on this impregnated carbon (12) is a cotton pad (13) and a screen (14). The screens (11) and (14) are preferably made of the same material as screen (5).

The materials in the canister are kept pressed against each other and in position by means of a spring (15) bearing against the screen (14) and the top (16) of the canister.

This canister is employed by attaching the outlet nozzle (17) to a hose or other suitable conduit leading to a gas mask. The air to be purified is drawn in thru the valve (3) and passes thru the activated charcoal (7) impregnated with the alkali metal hydroxide or other alkali, which removes part of the cyanogen chloride and hydrocyanic acid contained therein. On passing thru the pumice which has been treated with a suitable alkali (10), moisture, hydrocyanic acid and a part of the cyanogen chloride in the air are taken up by the pumice and the air freed thereof, and as this air is drawn thru the activated charcoal (12) impregnated with the alkali metal hydroxide or other alkali, the remainder of the cyanogen chloride will be taken out and the air passing thru the nozzle (17) to the gas mask will be free from the poisonous and toxic gases with which the air was vitiated when drawn into the canister.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a process of treating a mixture of gases containing toxic gases including cyanogen chloride, withdrawing moisture from said mixture and then passing the residual gas through dry, granular, inorganic, alkaline material.

2. In a process of treating air vitiated with toxic gases including cyanogen chloride, withdrawing moisture from said air, and then passing said air through dry, granular, inorganic alkaline material.

3. In an apparatus for treating air containing toxic gases including cyanogen chloride, a canister having in the path for gas passing therethrough a granular absorbent for moisture and substantially dry, granular, inorganic alkaline material.

4. In an apparatus for treating air containing toxic gases including cyanogen chloride, a canister having in the path for gas passing therethrough a granular absorbent for moisture and a substantially dry, granular alkaline hydroxide of a metal.

5. In an apparatus for treating air containing toxic gases including cyanogen chloride, a canister having in the path for gas passing therethrough a granular absorbent for moisture and a substantially dry, granular hydroxide of an alkali metal.

6. In an apparatus for treating air containing toxic gases including cyanogen chloride, a canister having in the path for gas passing therethrough a granular absorbent for moisture and substantially dry, granular pumice treated with a caustic alkali.

7. In an apparatus for treating air containing toxic gases including cyanogen chloride, a container having in the path for gas passing therethrough a granular absorbent for moisture and substantially dry, granular carbon impregnated with an alkaline inorganic reagent.

8. In an apparatus for treating air containing toxic gases including cyanogen chloride, a canister having in the path for gas passing therethrough a granular absorbent for moisture and substantially dry, granular carbon impregnated with an alkaline hydroxide of a metal.

9. In an apparatus for treating air containing toxic gases including cyanogen chloride, a canister having in the path for gas passing therethrough a granular absorbent for moisture and substantially dry, granular carbon impregnated with a hydroxide of an alkali metal.

10. In an apparatus for purifying air vitiated with cyanogen chloride, a drying agent and dry activated carbon impregnated with inorganic alkaline material and hexamethylenetetramine.

PAUL O. ROCKWELL.